United States Patent [19]
Heitmann et al.

[11] Patent Number: 5,169,876
[45] Date of Patent: Dec. 8, 1992

[54] PROCESS FOR PRODUCING A FLAME-RESISTANT ELASTIC SOFT POLYURETHANE FOAM

[75] Inventors: Ulrich Heitmann, Memmingen; Heribert Rossel, Buxheim, both of Fed. Rep. of Germany

[73] Assignee: Metzeler Schaum GmbH, Memmingen, Fed. Rep. of Germany

[21] Appl. No.: 615,488

[22] Filed: Nov. 19, 1990

Related U.S. Application Data

[63] Continuation of PCT/DE90/00203, Mar. 17, 1990.

[30] Foreign Application Priority Data

Mar. 18, 1989 [DE] Fed. Rep. of Germany ....... 3909017

[51] Int. Cl.$^5$ ............................................ C08G 18/06
[52] U.S. Cl. .................... 521/155; 521/107; 521/170
[58] Field of Search ............... 521/54, 137, 155, 170, 521/107

[56] References Cited

U.S. PATENT DOCUMENTS 4,148,781  4/1979  Narakawa et al. ............... 524/423
4,529,742  7/1985  von Bonin et al. ............... 521/108
4,843,105  6/1989  Reischl et al. ..................... 521/54
4,992,481  2/1991  von Bonin et al. ................. 521/54

Primary Examiner—John Kight, III
Assistant Examiner—John M. Cooney, Jr.
Attorney, Agent, or Firm—Herbert L. Lerner; Laurence A. Greenberg

[57] ABSTRACT

A process for producing a flame-resistant elastic soft polyurethane foam from a foam reaction component mixture of a polyol, a polyisocyanate, and a proportion of expanded graphite in the form of flakes as a flame retardant, includes initially admixing the flakes having a size on the order of magnitude of resultant foam cell walls with the polyol component. The flakes are incorporated to form at least part of the cell walls upon expansion of the foam.

16 Claims, 1 Drawing Sheet

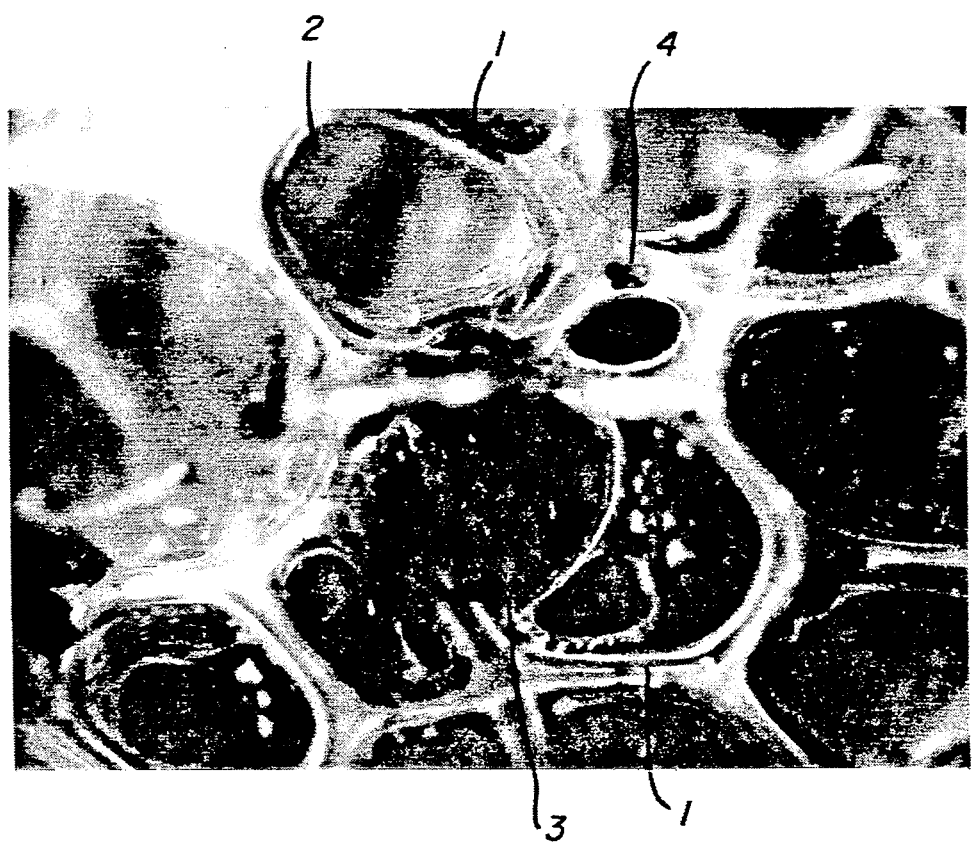

PROCESS FOR PRODUCING A FLAME-RESISTANT ELASTIC SOFT POLYURETHANE FOAM

CROSS TO RELATED APPLICATION:

This application is a continuation of International Application PCT/DE90/00203, filed Mar. 17, 1990.

The invention relates to a process for producing a flame-resistant elastic soft polyurethane foam.

It is known from Published European Application No. 0 192 888 to produce a flame-resistant elastic soft polyurethane foam from a foam reaction mixture with a polyol and an organic polyisocyanate, by adding expanded graphite to the reaction mixture. However, in that process there is a danger of the cell structure of the expanding foam being destroyed when the expanded graphite with the values indicated therein is incorporated, resulting in poorer long-term serviceability of the foam.

If the particles of the incorporated expanded graphite are in fact too large, the foam reaction is considerably hindered and the reaction mixture does not expand uniformly. On the other hand, if the expanded graphite particles are too small, the flame retardant and expansion properties are markedly diminished, depending on the particle size distribution, resulting in inadequate flame retardation. Moreover, the serviceability of the foam is reduced.

If pelletized graphite powder is used, then even if the particle size distribution is appropriate, the foam structure is still notably impaired, because the particles are not in the form of irregularly shaped flakes but rather in the form of beads and thus do not optimally fit into the foam structure. Instead, they destroy the cell structure, resulting in poorer serviceability. Furthermore, the swelling properties of such pellets and thus the performance of the foam in a fire are impaired considerably.

U.S. Pat. No. 3,574,644 also discloses using expanded graphite in the form of flakes of a size on the order of magnitude of from 10 to approximately 325 mesh, whereas a size on the order of from 10 to 60 mesh (0.25 to 2.0 mm) is preferred, for esthetic reasons and for homogeneity. However, such expanded graphite flakes are admixed with the finished reaction mixture. Due to the short pot times of the already-reacting foam mixture, adequate homogenization and thus good moistening of the individual flakes can only be achieved with difficulty. It is also virtually impossible to preclude clumping.

It is accordingly an object of the invention to provide a process for producing a flame-resistant elastic soft polyurethane foam, which overcomes the hereinaforementioned disadvantages of the heretofore-known methods of this general type, which on one hand exhibits a fire performance that fully meets the most stringent requirements and fire tests, such as the kerosene burner test specified by the testing standard FAR 25853 c, and on the other hand has optimal long-term serviceability, with virtually undiminished values as compared with conventionally flammable foams.

With the foregoing and other objects in view there is provided, in accordance with the invention, a process for producing a flame-resistant elastic soft polyurethane foam from a foam reaction component mixture of a polyol, a polyisocyanate, and a proportion of expanded graphite in the form of flakes as a flame retardant, which comprises initially admixing the flakes having a size on the order of magnitude of resultant foam cell walls with the polyol component, and incorporating the flakes to form at least part of the cell walls upon expansion of the foam.

In such a process, while using expanded graphite in flake form and of the size indicated, the graphite flakes are incorporated directly in the cell wall. In other words, the cell walls are formed virtually of the graphite flakes themselves, surrounded by cell ribs of pure foam material, thus resulting in minimum disturbance of the foam cell structure.

Initially mixing the expanded graphite flakes alone into the polyol component enables considerably more careful work to be done, because the pot time is unlimited and thus correspondingly larger batches can already be completed at a relatively long time before the actual foaming process. This also assures that optimal mixing and moistening of the individual graphite flakes takes place.

In accordance with another mode of the invention, there is provided a process which comprises initially admixing the expanded graphite flakes with only some of the polyol component while leaving a remaining polyol component containing other additives in the form of activators, accelerators, cross-linkers and other flame retardants. The reaction resistance and storage life of the components containing graphite are even further improved by this step.

In accordance with a further mode of the invention, there is provided a process which comprises elevating the temperature of the polyol component prior to admixing and incorporation of the expanded graphite, for the sake of better degassing of the polyol component and for largely avoid incorporating air into the polyol component due to agitation. With the resultant lowering of viscosity, moistening is also improved, and the mixture is more easily degassed.

The expanded graphite being used is practically formed of graphite, with $H_2SO_4$ or $SO_4$, for example, having two free negative valences, which attach to two free positive valences of a hydrocarbon ring, incorporated between the planes of the graphite mesh. When this foam is burned, this graphite expands to from 100 to 200 times its volume, giving off $SO_3$ and/or $SO_2$ and water. Burning, such as further burning of the foam, is thus largely prevented. A loose, expanded mass that acts in an insulating manner thus forms.

In accordance with an added mode of the invention, there is provided a process which comprises performing the admixing step with graphite flakes have a size of substantially from 0.3 to 1.0 mm, which is equivalent to a foam cell count of approximately 10 to 30 per centimeter.

Although an expanded graphite of this type provides good fireproofing, it often only weakly coheres after the polyurethane matrix has burned off, since the expanded graphite particles do not bake together. Instead, there is the danger that the flame pressure and the convection current of the ignition source will largely blow away the expanded particles, causing the protective film on the still unburned part of the foam to fall away and possibly allowing the fire to spread for a while.

In order to prevent this, in accordance with an additional mode of the invention, there is provided a process which comprises additionally initially dispersing caseine in powdered form in the polyol component.

In the presence of heat, this caseine forms practically a coke-like layer, which causes the expanded graphite particles to bake together and thus improves the protective action of the expanded graphite. The still unburned layers located beneath it are thus reliably protected as well.

In accordance with yet another mode of the invention, there is provided a process which comprises additionally dispersing hardened caseine in powdered form denatured with formaldehyde or isocyanate in the polyol component.

In accordance with yet a further mode of the invention, there is provided a process which comprises adjusting the proportion of the caseine to substantially from to 5 to 30 parts by weight (weight %), relative to the weight of the polyol component.

In accordance with yet an added mode of the invention, there is provided a process which comprises adjusting the amount of the caseine to be substantially at most equal to three times the amount of the expanded graphite.

In accordance with yet an additional mode of the invention, there is provided a process which comprises adjusting the proportion of the expanded graphite to substantially from 5 to 40 parts by weight relative to the weight of the polyol component.

In accordance with again another mode of the invention, there is provided a process which comprises adjusting the specific density of the filled foam to be substantially from 20 to 80 kg/m$^3$.

In order to also prevent the resultant pyrolysis gases from igniting in case of fire, in accordance with again a further mode of the invention, there is provided a process which comprises adding halogenated phosphoric acid ester in the foam reaction mixture as an additional flame retardant, as is known in principle from Published Japanese Application No. 50/159593.

In accordance with a concomitant mode of the invention, there is provided a process which comprises additionally admixing smoke reducers with the polyol component containing the expanded graphite, in order to considerably reduce smoke or smoke development in the event of fire. This is very important because it allows people to find possible escape routes in enclosed spaces.

Heavy metal compounds that are known per se may be used as the smoke reducers. In particular, these may be cyanides and complex ferrocyanides, metal oxides such as nickel-II oxide, iron-II oxide, molybdenum-VI oxide, vanadium-V oxide, and copper hydroxide phosphate, zinc borate, aluminum octamolybdate, aluminum hydroxide, magnesium hydroxide and ferrocene, for instance. Ferrocene has proved to be the most effective agent.

Other features which are considered as characteristic for the invention are set forth in the appended claims.

Although the invention is illustrated and described herein as embodied in a process for producing a flame-resistant elastic soft polyurethane foam, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying tables and photograph.

Referring now to the tables in detail and first, particularly, to Table 1 thereof, it is seen that the action of conventional expanded graphite and the expanded graphite modification according to the invention will be studied in terms of a number of examples, as given in Table I. Eleven different recipes were used, some of them with added smoke reducers, in order to prepare foams equipped for fire resistance, as shown in detail in the table.

TABLE I

| Recipe #: | 1 | 2 | 3 | 4 | 5 | 6 | 7 | 8 | 9 | 10 | 11 |
|---|---|---|---|---|---|---|---|---|---|---|---|
| Polyol (a) | 100 | 100 | 100 | 100 | 100 | 100 | — | 85 | 85 | 85 | 85 |
| Polyol (b) | — | — | — | — | — | — | 100 | — | — | — | — |
| Polyol (c) | — | — | — | — | — | — | — | 15 | 15 | 15 | 15 |
| Water | 3.0 | 3.0 | 3.0 | 3.0 | 3.0 | 3.0 | 3.0 | 3.0 | 3.0 | 3.0 | 3.0 |
| Amine activator (d) | 0.4 | 0.4 | 0.4 | 0.4 | 0.4 | 0.4 | — | — | 0.4 | 0.4 | 0.4 |
| Amine activator (e) | — | — | — | — | — | — | 0.15 | — | — | — | — |
| Amine activator (f) | — | — | — | — | — | — | 0.15 | — | — | — | — |
| Accelerator (g) | 0.1 | 0.1 | 0.1 | 0.1 | 0.1 | 0.1 | — | 0.1 | 0.1 | 0.1 | 0.1 |
| Accelerator (h) | — | — | — | — | — | — | 0.4 | — | — | — | — |
| Stabilizer (i) | 1.2 | 1.2 | 1.2 | 1.2 | 1.2 | 1.2 | — | 1.2 | 1.2 | 1.2 | 1.2 |
| Stabilizer (k) | — | — | — | — | — | 0.9 | — | — | — | — | — |
| Cross-linker (l) | 0.8 | 0.8 | 0.8 | 0.8 | 0.8 | 0.8 | — | 0.8 | 0.8 | 0.8 | 0.8 |
| Isocyanate (m) | 28.3 | 28.3 | 28.3 | 28.3 | 28.3 | 28.3 | 40.0 | 28.3 | 28.3 | 28.3 | 28.3 |
| Isocyanate (n) | 7.1 | 7.1 | 7.1 | 7.1 | 7.1 | 7.1 | — | 7.1 | 7.1 | 7.1 | 7.1 |
| Flame retardant (o) | 10.0 | — | — | — | — | — | 5 | 10.0 | 10.0 | 10.0 | 10.0 |
| Caseine | — | — | — | — | — | 20.0 | — | 20.0 | — | — | — |
| Expanded graphite, particle size 0.2–1 mm | 30.0 | — | — | — | — | 20.0 | 30.0 | 20.0 | 30.0 | 30.0 | 30.0 |
| Expanded graphite powder, 0.2 mm | — | 30.0 | 50.0 | — | — | — | — | — | — | — | — |
| Expanded graphite (pelletized powder/chip mixture) | — | — | — | 30.0 | 50.0 | — | — | — | — | — | — |
| Smoke reducer (p) | | | | | | | | — | 2 | — | 0 |
| Smoke reducer (q) | | | | | | | | — | — | 2 | 0 |

TABLE II

Polyol (a), polyether polyol, such as Desmophen 3973 (Bayer)
Polyol (b), polyether polyol, such as Desmophen 7160 (Bayer)
Polyol (c), polymer-filled, such as Desmophen 7619 (Bayer)
Amine activator (d), such as Polycat 77 (Air Products)
Amine activator (e), such as Dabco 33 LV (Air Products)

TABLE II-continued

Amine activator (f), such as Bulab 600 (Buckmann, Bad Homburg, Germany)
Accelerator (g), such as dibutyl tin dilaurate
Accelerator (h), such as tin-II-octoate
Stabilizer (i), such as B 4690 (Goldschmidt)
Stabilizer (k), such as B 4900 (Goldschmidt)
Cross-linker (l), such as V 56 (Bayer)
Isocyanate (m), such as Desmodur T 80 (Bayer)
Isocyanate (n), such as Desmodur 4 V 20 (Bayer)
Flame retardant (o), such as Thermolin 101 (Olin)
Smoke reducer (p), copper hydroxide phosphate
Smoke reducer (q), ferrocene The preparation of an elastic foam will be described below in detail, for example in accordance with recipe No. 11:

850 g of a polyol (a) are mixed with 150 g of a polyol (c) by means of a propeller agitator and with continued stirring, 300 g of expanded graphite of a defined flake size are added until as uniform as possible a suspension of the graphite in the polyol has been obtained. The structure of the agitator and the agitation speed should be selected in such a way that as little shearing action is exerted upon a graphite as possible, so that the original flake size is largely maintained. Preferably, the polyols are heated to a temperature of from 40° to 70° C., markedly lowering the viscosity of the polyol and thus improving the moistening of the graphite. Next, according to the recipe, the other ingredients, water, stabilizers, accelerators, activators, flame retardants and optionally smoke reducers and cross-linkers, are added and agitated.

The resultant mixture is mixed while stirring, in a ratio by weight of 145:35, with a mixture of an isocyanate (m) and an isocyanate (n) in a ratio by weight of 70:30, and after approximately 5 to 10 seconds they are placed in a mold for reaction. The foam can be unmolded after approximately 5 to 10 minutes, while advantageously employing heat.

The physical properties of such a foam are determined in a standardized climate after 72 hours of storage, resulting in the values listed below in Table III.

TABLE III

|  | Foam per recipe 11 | Comparison foam without flame retardant or expanded graphite |
|---|---|---|
| Raw density (kg/m³) DIN 53 420 | 60 | 45 |
| Tensile strength (kPa) DIN 53 571 | 115 | 150 |
| Breaking elongation (%) DIN 53 371 | 115 | 125 |
| Permanent set (%) DIN 53 572 | 5 | 6 |
| Fatigue test DIN 53 574 |  |  |
| hardness loss (%) | 13 | 14 |
| height loss (%) | 1.5 | 2 |

In the foam prepared by the example given above, the good values for permanent set and the low loss in height and hardness after the fatigue test should be stressed. As a result, the serviceability is virtually unchanged as compared with a conventional foam that is not equipped for flame resistance.

In such a production process, in order to increase and improve the reaction resistance and storage life of the components containing the expanded graphite, or in other words to increase and improve the pot time, it is particularly advantageous if the expanded graphite is initially mixed with only some of the largely water-free polyol, which contains less than 0.1% water, and is not brought together and mixed with the remaining amount of polyol and the mixture is formed of water, activators, accelerators, cross-linkers, other flame retardants and the smoke reducer, until shortly before the reaction with the isocyanate.

In so doing, however, care must always be taken to prevent settling of the expanded graphite suspended in the polyol, by careful agitation or recirculation.

As is described in the above example, in which the reaction mixture is brought to reaction in a mold in the small quantity given, the equivalent procedure will logically also be used in processing components in known high and low-pressure machines for producing block foams and mold foams.

As the list of recipes in Table I shows, six recipes having the expanded graphite flakes according to the invention were tested and compared with two recipes, each having powdered expanded graphite and pelletized powder, with different proportions of expanded graphite. Two recipes were also provided with smoke reducers.

The eleven different foams thus obtained were then subjected to conventional fire tests, the results of which are listed below in Table IV.

TABLE IV

| Test: | Crib 7 | Crib 4 | UIC | UL94 vertical | FAR 25853b | FAR 25853c |
|---|---|---|---|---|---|---|
| Example 1 | P | P | P | V0 | P | P |
| Example 2 | F | F | F | V2 | F | F |
| Example 3 | F | F | F | V2 | F | F |
| Example 4 | F | P | P | V2 | F | F |
| Example 5 | P | P | P | V0 | P | F |
| Example 6 | P | P | P | V0 | P | P |
| Example 7 | P | P | P | V0 | P | P |
| Example 8 | P | P | P | V0 | P | P |
| Example 9 | P | P | P | V0 | P | P |
| Example 10 | P | P | P | V0 | P | P |
| Example 11 | P | P | P | V0 | P | P |

P = passed
F = failed

The Crib 4 and Crib 7 tests are equivalent to British Standard 5852, Part 2, in which a wooden crib stacked on the material to be tested is burned and the fire performance of the material under it is evaluated. This test can be graded as "passed" or "failed" in accordance with given specifications. The Crib 7 test meets a higher standard, since according to specifications the ignition source has a larger mass.

The UIC test is a test process of the Union Internationale des Chemins de Fer, in which 100 g of paper, wadded up into a ball, is burned on the material to be tested.

In the UL94 vertical test of Underwriters Laboratories, a strip, which is 13×13×127 mm in size, of material to be tested is exposed to a flame from below, and then the burned length, burning time and possible dripping of the melted burning material are measured and classified accordingly. V0 designates higher fireproofing protection than V2, for example.

The FAR 25853 b and c tests are respective bunsen burner and kerosene burner tests, in which the material is ignited from a short distance with a very hot, intensive flame over a specified period of time.

As the results of these tests clearly show, the worst fire performance was exhibited by the recipes having expanded graphite powder in a graduated size of less than 0.2 mm, which even at higher concentrations had virtually no adequate effect. Only the recipe with a proportion of 50 parts by weight of expanded graphite yielded a better result, but it still did not pass the kerosene burner test.

In comparison, the foams of recipes 1 and 6-11 with the expanded graphite particle size distribution according to the invention passed all of the tests excellently and in each case achieved the highest classification.

With respect to the use of smoke reducers in the recipes 9 and 10 and the comparison recipe 11 without a reducer, the corresponding values are given in Table V below.

TABLE V

| Recipe | 9 | 10 | 11 |
|---|---|---|---|
| Ds | 0.55 | 0.47 | 0.86 |
| Tm (s) | 156 | 111 | 141 |

Ds = Maximum optical density
Tm = Time of occurrence of maximum optical density.

Testing of the smoke density was performed according to ISO Draft Technical Report 5924. The result was that if the given smoke reducers are used, the smoke density is less by approximately half than in a foam treated for flame resistance without a smoke reducer. In other words, visibility was reduced to no worse than about 50%, so that clear contours remained visible even at a great distance.

The drawing is a reproduction of a photograph illustrating a microscopic section taken through a foam that is equipped in accordance with the invention.

Referring now to the reproduction of the photograph in detail, it is seen that the incorporation of the expanded graphite flakes can be seen especially clearly in the microscopic section which is taken through a foam equipped in accordance with the invention, and enlarged approximately 100 times.

The foam is essentially made up of relatively solid cell ribs 1, which form the actual skeleton of the foam and are essentially definitive for its serviceability, as well as very thin foam cell walls 2 that form between the cell ribs 1. With the indicated size selection for the expanded graphite flakes and with the production process indicated herein, some expanded graphite flakes 3 have been incorporated between the cell ribs 1 in such a way that they practically form the original foam cell wall. With this incorporation solely as a cell wall, the serviceability of the foam is thus only insignificantly changed, yet on the other hand a high level of fireproofing is attained, because a very large surface area of the foam cells is occupied by these graphite flakes.

Additionally, an incorporated graphite particle 4, that is virtually in the form of dust, which is a form in which it can also occur, of course, can be seen at a cell rib intersection. Due to its small size, this graphite dust particle 4 was able to incorporate into a cell rib or cell rib intersection. However, since this might interrupt the cell rib structure and thus change the essential values for the physical properties of the foam, such small graphite particles should be avoided if at all possible.

In summary, it is thus demonstrated that using expanded graphite in flake form, in a size distribution that is equivalent to the cell structure of the foam, and producing the reaction mixture with the expanded graphite as indicated, offer the least hindrance to expansion of the foam, thus keeping its long-term serviceability at practically the same level as that of an untreated foam, yet considerably improving its fire performance.

We claim:

1. In a process for producing a flame-resistant elastic soft polyurethane foam from a foam reaction component mixture of a polyol, a polyisocyanate, and a proportion of expanded graphite in the form of flakes as a flame retardant, the improvement which comprises initially admixing the flakes having a size on the order of magnitude of resultant foam cell walls with the polyol component, and incorporating the flakes to form at least part of the cell walls upon expansion of the foam.

2. Process according to claim 1, which comprises initially admixing the expanded graphite flakes with only some of the polyol component while leaving a remaining polyol component containing other additives in the form of activators, accelerators, cross-linkers and other flame retardants.

3. Process according to claim 1, which comprises elevating the temperature of the polyol component prior to admixing.

4. Process according to claim 1, which comprises additionally admixing smoke reducers with the polyol component containing the expanded graphite.

5. Process according to claim 1, which comprises performing the admixing step with graphite flakes have a size of substantially from 0.3 to 1.0 mm.

6. Process according to claim 1, which comprises additionally dispersing caseine in powdered form in the polyol component.

7. Process according to claim 1, which comprises additionally dispersing hardened, denatured caseine in powdered form in the polyol component.

8. Process according to claim 6, which comprises adjusting the proportion of the caseine to substantially from to 5 to 30 parts by weight, relative to the weight of the polyol component.

9. Process according to claim 7, which comprises adjusting the proportion of the caseine to substantially from to 5 to 30 parts by weight, relative to the weight of the polyol component.

10. Process according to claim 6, which comprises adjusting the amount of the caseine to be substantially at most equal to three times the amount of the expanded graphite.

11. Process according to claim 7, which comprises adjusting the amount of the caseine to be substantially at most equal to three times the amount of the expanded graphite.

12. Process according to claim 8, which comprises adjusting the amount of the caseine to be substantially at most equal to three times the amount of the expanded graphite.

13. Process according to claim 9, which comprises adjusting the amount of the caseine to be substantially at most equal to three times the amount of the expanded graphite.

14. Process according to claim 1, which comprises adjusting the proportion of the expanded graphite to substantially from 5 to 40 parts by weight relative to the weight of the polyol component.

15. Process according to claim 1, which comprises adjusting the specific density of the filled foam to be substantially from 20 to 80 kg/m$^3$.

16. Process according to claim 1, which comprises adding halogenated phosphoric acid ester as an additional flame retardant.

* * * * *